United States Patent [19]

Moretti et al.

[11] Patent Number: 5,033,566
[45] Date of Patent: Jul. 23, 1991

[54] DEVICE FOR STEERING THE REAR WHEELS OF A VEHICLE WITH FOUR WHEEL STEERING

[75] Inventors: Antonio Moretti, Bonnelles; Jean-Louis Laffont, Paris; Pascal Vaumoron, Montigny-Le-Bretonneux, all of France

[73] Assignee: Regie Nationale Des Usines Renault S.A., Boulogne-Billancourt, France

[21] Appl. No.: 442,585

[22] Filed: Nov. 29, 1989

[30] Foreign Application Priority Data

Nov. 29, 1988 [FR] France .................................. 8815556

[51] Int. Cl.$^5$ ............................................. B62D 5/04
[52] U.S. Cl. .................................... 180/79.1; 280/91; 74/89.15
[58] Field of Search ........................ 180/79.1, 140, 148, 180/154, 158; 280/91; 74/89.15, 424 8 R, 388 PS

[56] References Cited

U.S. PATENT DOCUMENTS

| 3,498,630 | 3/1970 | Crawford | 180/79.1 |
|---|---|---|---|
| 3,871,468 | 3/1975 | Miura | 180/154 |
| 4,144,948 | 2/1979 | Sergay | 74/388 PS |
| 4,416,345 | 11/1983 | Barthelemy | 180/79.1 |
| 4,645,025 | 2/1987 | Ohe et al. | 180/79.1 |
| 4,724,917 | 2/1988 | Naito et al. | 180/79.1 |
| 4,838,106 | 6/1989 | Adams | 74/388 PS |

FOREIGN PATENT DOCUMENTS

| 0084501 | 7/1983 | European Pat. Off. | 180/148 |
|---|---|---|---|
| 0133003 | 2/1985 | European Pat. Off. | |
| 1074632 | 10/1954 | France | |
| 2591986 | 6/1987 | France | |
| 0137269 | 6/1987 | Japan | 180/79.1 |
| 2187692 | 9/1987 | United Kingdom | 180/79.1 |
| 8702632 | 5/1987 | World Int. Prop. O. | |

OTHER PUBLICATIONS

Figure 2:
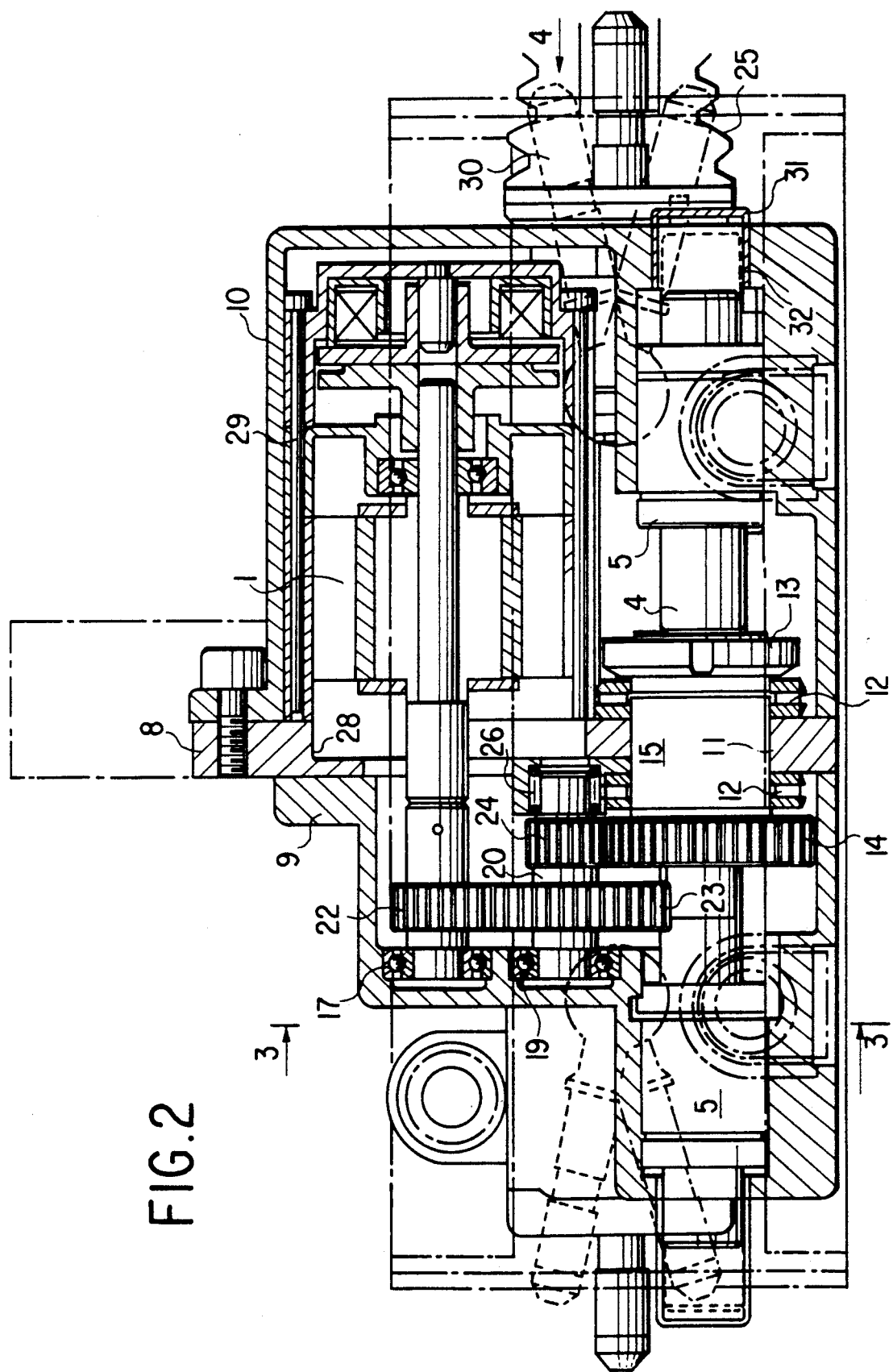
Figure 6:
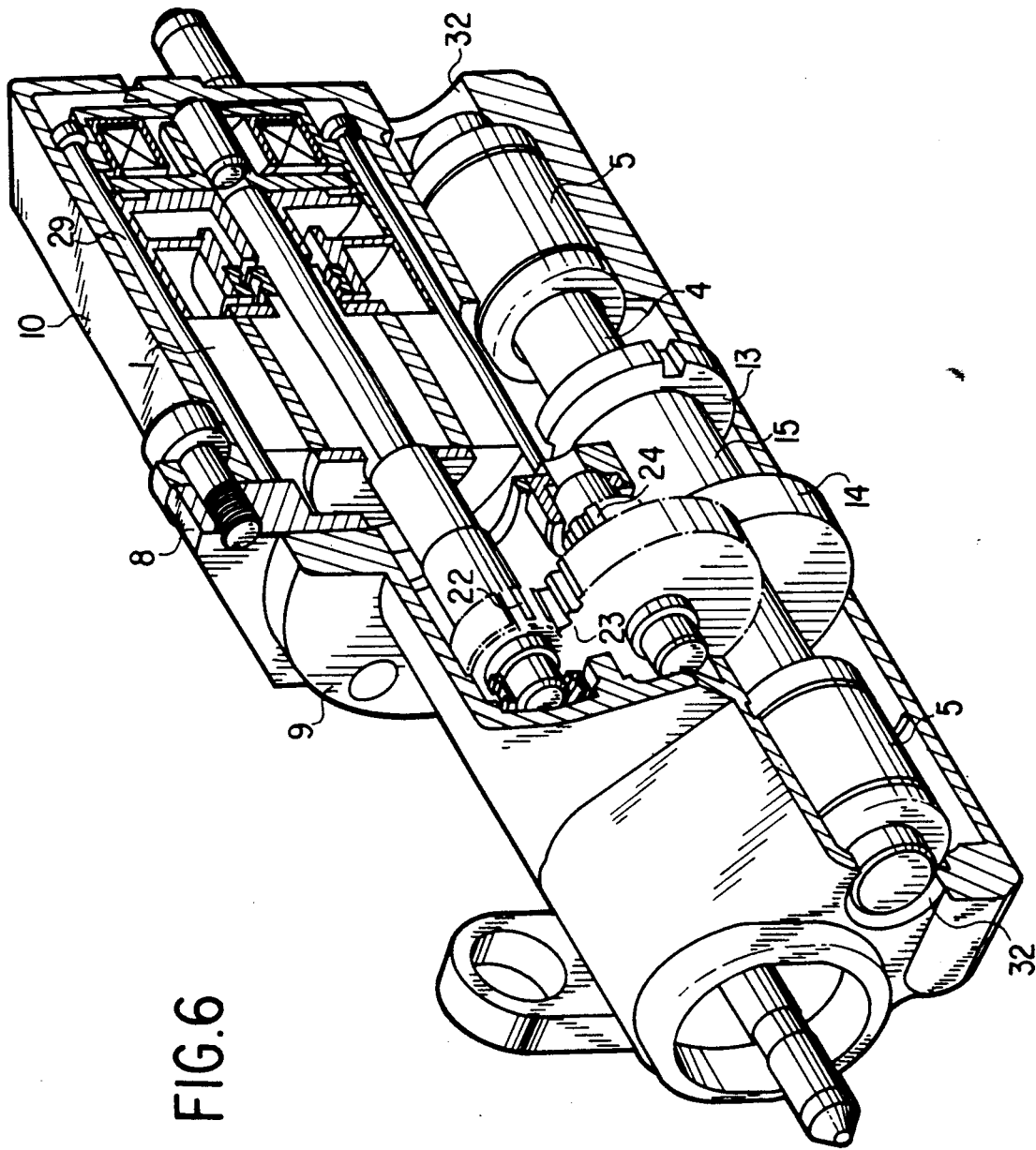

Patent Abstracts of Japan, vol. 11, No. 16 (M-554) [2463], 16 Jan. 1987; & JP-A-61 191 468 (Nippon Seiko K.K.) 26-08-1986 *Resume; FIGS. 2,6*.

Primary Examiner—Charles A. Marmor
Assistant Examiner—Mitchell Bompey
Attorney, Agent, or Firm—Oblon, Spivak, McClelland, Maier & Neustadt

[57] ABSTRACT

Device for steering the rear wheels of a vehicle with four wheel steering comprising an electric drive systems (1), a bolt-nut system (2) and a reduction mechanism (3), bolt (4) is placed between two guide elements (5) and is integral with an interball joint bar (6) by two connecting elements (7), said interball joint bar (6) being parallel to bolt (4); the unit being supported by a central plate (8) which receives two cases placed on both sides of said plate (8) to which they are attached so as to have a closed unit, interball joint bar (6) passing through said central plate (8).

14 Claims, 6 Drawing Sheets

DEVICE FOR STEERING THE REAR WHEELS OF A VEHICLE WITH FOUR WHEEL STEERING

This invention relates to a device for steering the rear wheels of a vehicle with four wheel steering.

Devices with four wheel steering are known which use an electric motor driving a crossbar by a mechanical unit optionally comprising a reduction mechanism. These units call for a significant space between the ball joints of the control links of the wheels. Moreover, these devices necessitate a space in the longitudinal direction of the vehicle and particularly in front of the axis of the crossbar, which poses installation problems.

The object of this invention is to propose a device for steering the rear wheels of a vehicle with four wheel steering which is small enough to be able to mount it without difficulty in the rear structure of a current passenger motor vehicle.

According to an embodiment of the invention, the device for steering the rear wheels of a vehicle with four wheel steering comprises an electric drive system, a bolt-nut system and a reduction mechanism. Said bolt is placed between two guide elements and is integral with an interball joint bar by two connecting elements, said interball joint bar being parallel to the bolt, and the unit being supported by a central plate which receives two cases placed on both sides of said plate to which they are attached so as to have a closed unit, the interball joint bar passing through said central plate.

The device for steering the rear wheels of a vehicle with four wheel steering according to the invention thus exhibits the advantage of having a relatively small space requirement in the crosswise direction, which makes possible an easy installation between the ball joints of the control links of the wheels. Moreover, the device has a very small space requirement in front of the axis of the interball joint bar.

Figure 1:
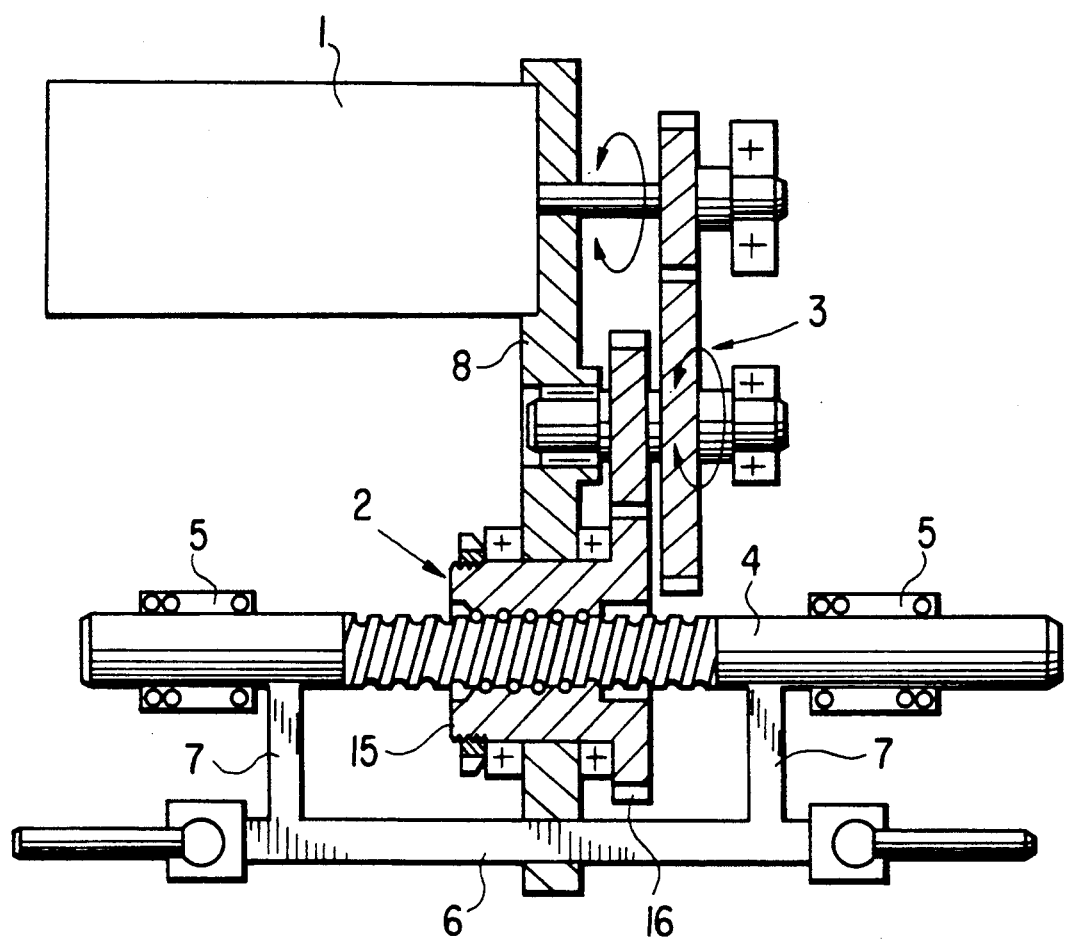
Figure 3:
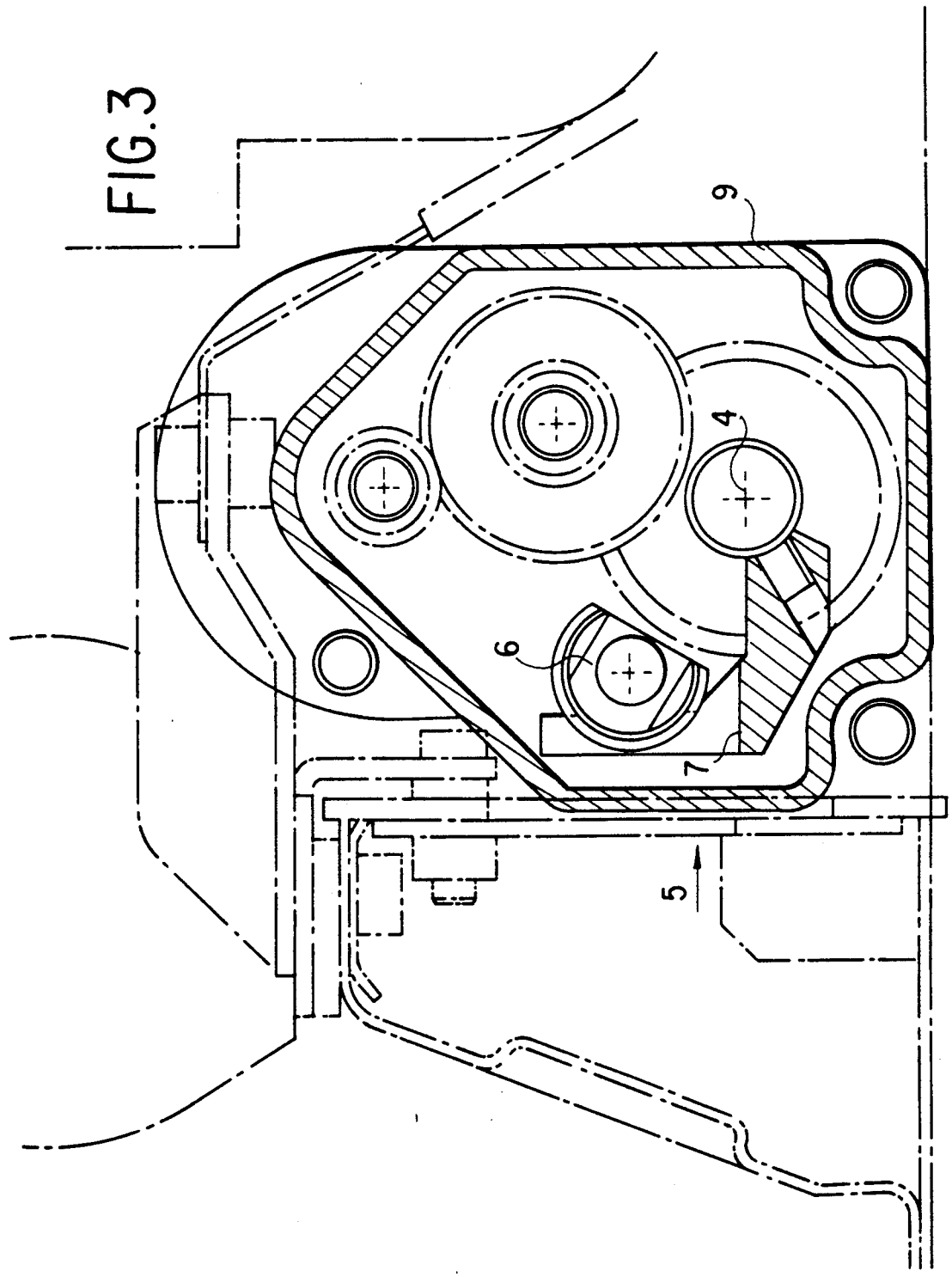
Figure 4:
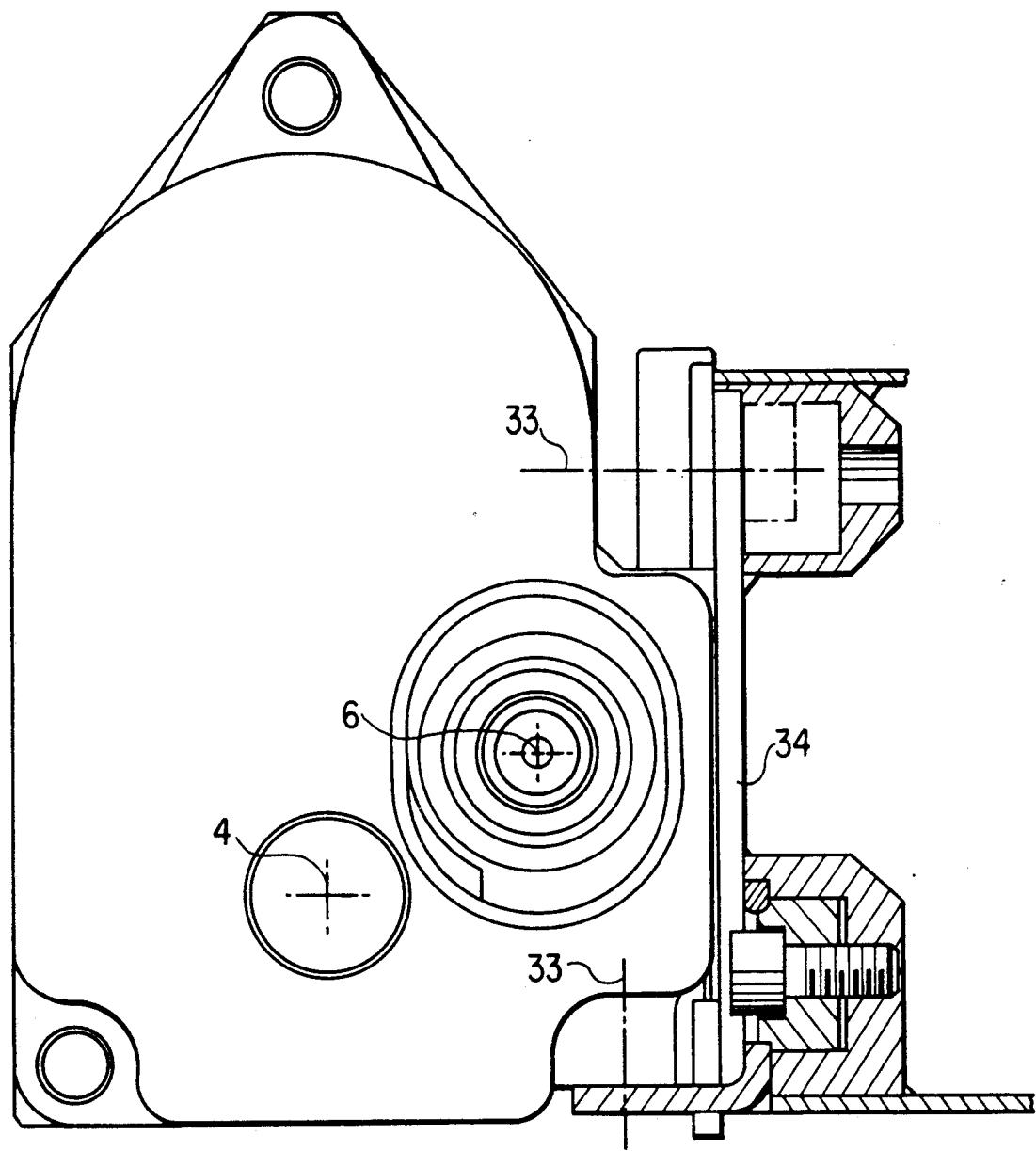
Figure 5:
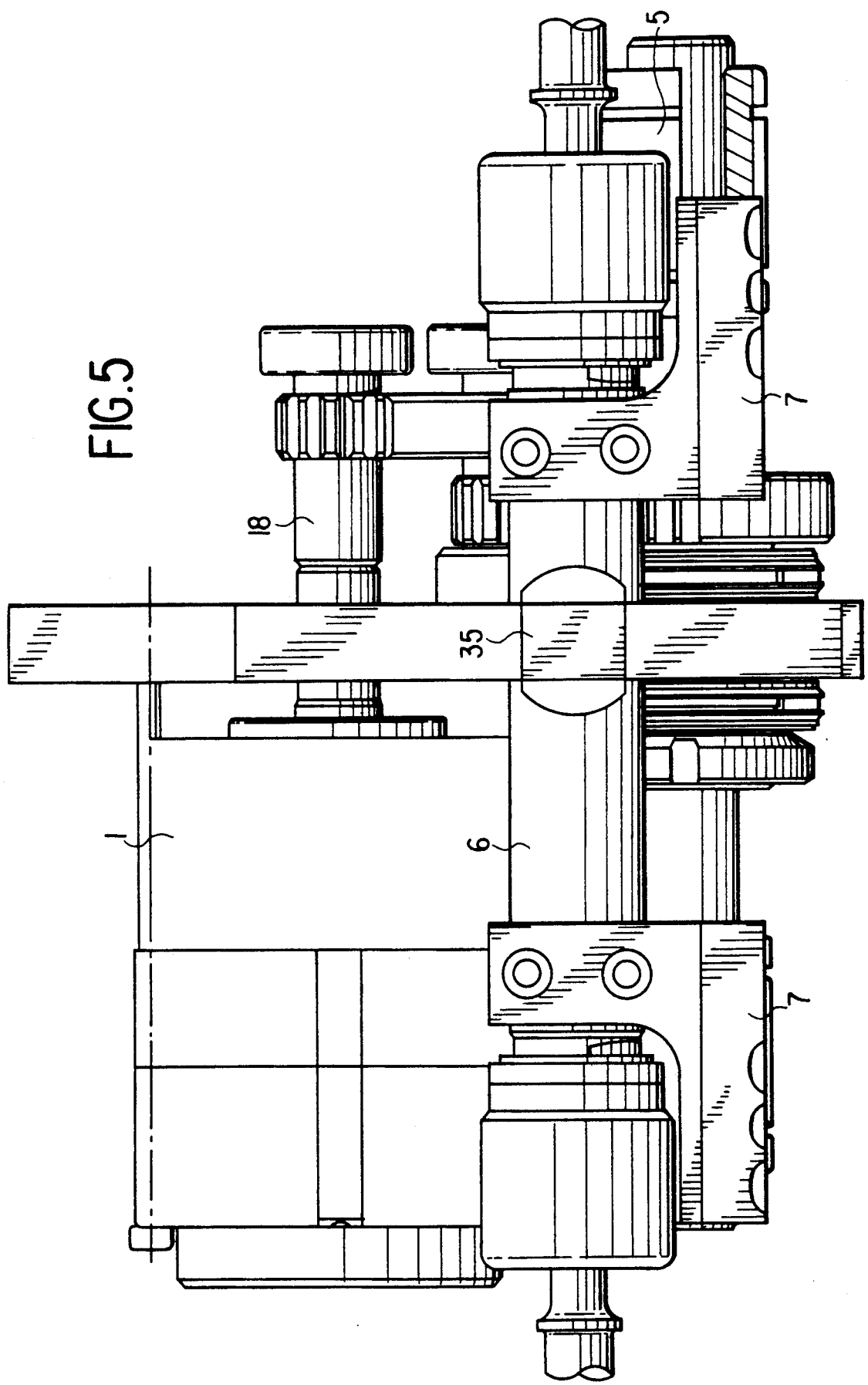

Other characteristics and advantages of this invention will be evident from the description which follows the embodiment given by way of example in reference to the accompanying drawings in which:

FIG. 1 is a developed diagrammatic view in section of the entire device according to the invention, FIG. 2 is a view in cross section of the entire device corresponding to FIG. 1 passing through the axis of the electric drive system and through the axis of the bolt, FIG. 3 is a section along 3 of FIG. 2, FIG. 4 is a view along 4 of FIG. 2, with a partial section, FIG. 5 is a view along 5 of FIG. 3, the housing being removed, FIG. 6 is a bird's-eye view, with tearaway, of the entire device according to the invention.

The device for steering the rear wheels of a vehicle with four wheel steering according to the invention comprises, on one hand:
an electric drive system referenced 1 as a whole,
a reduction mechanism reference 3 as a whole,
a bolt-nut system referenced 2 as a whole.

Drive system 1 sends the movement of rotation to bolt-nut system 2 by reduction mechanism 3.

On the other hand, the device according to the invention comprises:
two guide elements 5 placed on both sides of bolt 4,
an interball joint bar 6,
two connecting elements 7.

Bolt 4 is integral with interball joint bar 6 by two connecting elements 7; bolt 4 and interball joint bar 6 being parallel relative to one another.

A central plate 8 supports the entire device as well as two cases referenced 9 and 10 which are attached on both sides of said plate 8 so as to have a closed unit. Interball joint bar 6 goes through central plate 8.

Reduction mechanism 3 comprises a drive pinion 22, two intermediate pinions 23 and 24 and a receiving pinion 16. Drive pinion 22 is mounted on a drive shaft 18 and is integral with this drive shaft 18 which is moved in rotation by electric drive system 1 with drive motor. Intermediate pinions 23 and 24 are mounted on an intermediate shaft 20 with which they are integral. Receiving pinion 16 is integral with nut 15 of bolt-nut system 2. Drive pinion 22 engages with intermediate pinion 23, and intermediate pinion 24 engages with receiving pinion 16.

Bolt-nut system 2 is mounted by nut 15 in a housing 11 of central plate 8. Nut 15 is held axially by two roller thrust bearings 12, which are located on both sides of central plate 8.

Nut 15 has a shoulder 14 which is applied against roller thrust bearing 12 by a clamping nut 13 which is screwed onto the threaded end of said nut 15 and is locked against the other roller thrust bearing 12. The entire nut 15 is designed so that clamping nut 13 gives a prestressing to roller thrust bearings 12.

On the periphery of shoulder 14, nut 15 contains receiving pinion 16 with which it is integral. Bolt-nut system 2 has ball circulation.

Bolt 4 extends on both sides of its threaded part so as to be able to be supported by two guide elements 5, which are ball bushes.

Two connecting elements 7 are parts in the shape of a bracket which are mounted on bolt 4 on both sides of nut 15, and which are attached to said bolt 4 with a bolt. These connecting elements 7 carry interball joint bar 6, which is bolted to said connecting elements 7. Moreover, connecting elements 7 respectively fit inside corresponding guide element 5, which has an opening to limit the axial space.

Case 9 comprises a housing 17, a housing 19 and a housing 21. Housing 17 receives a roller bearing which supports drive shaft 18, and housing 19 receives a roller bearing which supports intermediate axis 20. Housing 21 is made to place corresponding guide element 5 there. Intermediate shaft 20 is supported, on the side of nut 15, by a needle roller bearing 20 which is mounted on central plate 8. Reduction mechanism 3 thus is enclosed in case 9.

Drive motor 1 is placed inside case 10. It is mounted in a housing 28 of central plate 8, and it is attached to this central plate 8 by bolt 29.

Drive shaft 18 thus is supported by a roller bearing placed inside drive motor 1, and by the roller bearing placed inside housing 17.

Each case 9 and 10 bolted to central plate 8.

Case 10 also comprises a housing 27 which receives corresponding guide element 5.

The seal of each end of interball joint bar 6 is assured by a bellows 25, which also includes corresponding ball joint 30.

The seal of each end of bolt 4 is assured by a plug 31 which is mounted in a passage hole 32 of said corresponding end. This passage hole 32 is provided in case 9 or 10 concerned.

The unit of cases 9 and 10 has fastening holes 33 which make it possible to mount and to attach the entire device to a plane face 34 of the rear cradle of the vehicle.

Interball joint bar 6 comprises two flat surfaces 35, which are symmetrical relative to the axis of the bar, and which have a length slightly greater than the travel of said bar 6 increased by the thickness of central plate 8.

We claim:

1. In a vehicle having four wheel steering, a device for steering rear wheels of the vehicle comprising:
   an electric drive system,
   a bolt-nut system, and
   a reduction mechanism, wherein
   said bolt-nut system includes a bolt placed between first and second guide elements, said bolt being integral with an interball joint bar by first and second connecting elements, said interball joint bar being parallel to the bolt;
   a central plate supporting the device and receiving first and second cases, one of said cases placed on each side of said plate, said cases being attached to said central plate so as to form a closed uint, and said interball joint bar passing through said central plate.

2. The steering device according to claim 1, wherein said bolt-nut system has ball circulation.

3. The steering device according to claim 1, wherein said bolt-nut system is mounted in a housing of said central plate and is held on both sides by a thrust bearing held by a clamping nut which works with a shoulder integral with a threaded nut.

4. The steering device according to claim 3, wherein said thrust bearings are roller thrust bearings and said clamping nut gives a pre-stressing to said roller thrust bearings.

5. The steering device according to claim 3, wherein a receiving pinion of the reduction mechanism is incorporated in the shoulder of the threaded nut.

6. The steering device according to claim 1, wherein said first and second guide elements are ball bushes.

7. The steering device according to claim 1, wherein said first and second connecting elements are parts in the shape of a bracket which are mounted on the bolt and which are bolted to said interball joint bar.

8. The steering device according to claim 1, wherein said first and second connecting elements respectively fit inside a corresponding one of said first and second guide elements.

9. A steering device according to claim 3, wherein:
   said first case comprises a first housing for a first roller bearing for a drive shaft, a second housing for a second roller bearing for an intermediate shaft and a third housing for said first guide element, said first case also enclosing a reduction mechanism, said reduction mechanism comprising a drive pinion integral with said drive shaft, two intermediate pinions integral with said intermediate shaft and a receiving pinion, said intermediate shaft being supported on a side of the threaded nut by a needle roller bearing mounted on the central plate; and wherein
   said second case comprises a housing for said second guide element.

10. Steering device according to claim 9, wherein case (10) comprises drive motor (1) which is mounted in a housing (28) of central plate (8), and which is attached to this central plate (8) by bolt (29).

11. The steering device according to claim 9, wherein the interball joint bar includes a seal at each end assured by a bellows which includes a corresponding ball joint.

12. The steering device according to claim 9, wherein the bolt includes a seal at each end assured by a plug mounted in a passage hole in each of said first and second cases.

13. The steering device according to claim 9, wherein said first and second cases have fastening holes which make it possible to mount and to attach the entire device to a plane face of a rear cradle of the vehicle.

14. The steering device according to claim 1, wherein said interball joint bar comprises two flat surfaces, where it passes through said central plate.

* * * * *